United States Patent
O'Brien et al.

(10) Patent No.: US 8,029,718 B2
(45) Date of Patent: Oct. 4, 2011

(54) PROCESS FOR FORMING MULTI-LAYER MOLDED ARTICLES

(75) Inventors: Gregory S. O'Brien, Downingtown, PA (US); Bruce Clay, Boyertown, PA (US); Ronald Partridge, Royersford, PA (US)

(73) Assignee: Arkema Inc., King of Prussia, PA (US)

( * ) Notice: Subject to any disclaimer, the term of this patent is extended or adjusted under 35 U.S.C. 154(b) by 0 days.

(21) Appl. No.: 12/294,137

(22) PCT Filed: Apr. 4, 2007

(86) PCT No.: PCT/US2007/065946
§ 371 (c)(1),
(2), (4) Date: Sep. 23, 2008

(87) PCT Pub. No.: WO2007/121090
PCT Pub. Date: Oct. 25, 2007

(65) Prior Publication Data
US 2009/0224421 A1    Sep. 10, 2009

Related U.S. Application Data

(60) Provisional application No. 60/791,862, filed on Apr. 13, 2006.

(51) Int. Cl.
*B29C 41/04* (2006.01)
(52) U.S. Cl. .................... 264/310; 264/241
(58) Field of Classification Search .......... 264/241, 264/310; 118/318; 3/241
See application file for complete search history.

(56) References Cited

U.S. PATENT DOCUMENTS

| | | | | |
|---|---|---|---|---|
| 4,721,159 A | * | 1/1988 | Ohkochi et al. | 166/286 |
| 4,952,350 A | * | 8/1990 | Duffy | 264/45.7 |
| 4,988,549 A | | 1/1991 | Meyer et al. | |
| 6,555,243 B2 | | 4/2003 | Flepp et al. | |
| 2002/0012806 A1 | * | 1/2002 | Flepp et al. | 428/474.9 |
| 2005/0115753 A1 | | 6/2005 | Pemberton et al. | |
| 2006/0251835 A1 | | 11/2006 | Maziers et al. | |
| 2007/0254174 A1 | | 11/2007 | O'Brien et al. | |
| 2008/0145582 A1 | * | 6/2008 | Spence et al. | 264/267 |
| 2008/0224349 A1 | * | 9/2008 | Wang et al. | 264/241 |

FOREIGN PATENT DOCUMENTS

| JP | 48-74741 | | 7/1973 |
|---|---|---|---|
| WO | WO2004045849 | * | 9/2004 |

* cited by examiner

*Primary Examiner* — Joseph Del Sole
*Assistant Examiner* — Timothy Kennedy
(74) *Attorney, Agent, or Firm* — Thomas F. Roland

(57) ABSTRACT

The invention relates to a rotomolding process for forming a multi-layer article of two different polymers with different melting points in which an outer layer polymer powder is added to a rotational molder along with an inner layer polymer powder that is separated from the outer layer powder by a release film. The release film has a particular melting point that is greater than that of the outer layer polymer and preferably between the melting points of the inside layer and outside layer polymers. In one embodiment, the release layer forms an enclosure or bag in which the inner layer (higher melting point) powder is enclosed. In another embodiment the release film forms a barrier between an insulated cavity and the mold. The process provides a means for a "one-shot" rotomolding method.

14 Claims, 4 Drawing Sheets

(Example 3)
Copolyamide A Bag, Tm= 150 - 155°C, 150 microns thickness (Example 2)
40D PEBA B - Block Copolymer Bag, Tm=145°C, 75 microns in thickness (Example 3)
Copolyamide A Bag, Tm= 150 - 155°C, 150 microns thickness (Comparative 4)
Polyethylene Bag, Tm = 120°C, 100 microns thickness (Comparative 5)
Polyethylene Bag, Tm = 120°C, 100 microns thickness (Comparative 5)
Polyethylene Bag, Tm = 120°C, 100 microns thickness (Comparative 6)
Polyethylene Bag, Tm = 120, 50 microns thickness (Comparative 6)
Polyethylene Bag, Tm = 120, 50 microns thickness

PROCESS FOR FORMING MULTI-LAYER MOLDED ARTICLES

"This application claims benefit, under U.S.C. §119 or §365 of U.S. Provisional Application No. 60/791,862, filed Apr. 13, 2006; and PCT/US2007/065946, filed Apr. 4, 2007."

FIELD OF THE INVENTION

The invention relates to a rotomolding process for forming a multi-layer article of two different polymers with different melting points in which an outer layer polymer powder is added to a rotational molder along with an inner layer polymer powder that is separated from the outer layer powder by a release film. The release film has a particular melting point that is greater than that of the outer layer polymer and preferably between the melting points of the inside layer and outside layer polymers. In one embodiment, the release layer forms an enclosure or bag in which the inner layer (higher melting point) powder is enclosed. In another embodiment the release film forms a barrier between an insulated cavity and the mold. The process provides a means for a "one-shot" rotomolding method.

BACKGROUND OF THE INVENTION

Rotomolding is used for the manufacture of simple to complex, hollow plastic articles. It can be used to mold a variety of materials such as polyethylene, polypropylene, polycarbonate, polyamide, fluoropolymers, polyvinyl chloride (PVC) and mixtures thereof. Linear low density polyethylene (LLDPE) is often used as disclosed for example in "Some new results on rotational moulding of metallocene polyethylenes" by D. Annechini, E. Takacs and J. Vlachopoulos in ANTEC, vol. 1, 2001 and in U.S. patent application 20050255264.

It is often desirable to form a multi-layer rotationally molded article, to combine the attributes of two different polymeric materials. Presently, there are two methods used commercially to produce a multi-layer article—both involve a manual addition of the second layer components after the first layer has formed. The first involves the use of an insulated drop-box that is attached to the mold to keep one powder cool, while the first layer is formed in the mold, and at the proper time to open a valve that allows this powder to enter the hot mold and then be rotated to form a second layer. The second method involves a process whereby the mold is removed from the oven and a second layer material is added manually to either a hot or a cold mold, followed by rotationally molding the second layer, such as found in U.S. Pat. No. 4,988,549 (polyamide layer and polyisocyanate/polyepoxide layer) or WO 2005/115753 (fluoropolymer/non-fluoropolymer such as polyolefins). Unfortunately, both of these methods result in lowering the productivity of the molding operation, either due to fewer molds being placed on a given arm, or due to the added time for "two" rotational molding cycles. There is a need for a one-shot process for efficiently producing multi-layer rotationally molded articles.

Several one-shot processes have been used to prepare a multi-layer rotomolded articles. WO 2004/045849 describes forming a multi-layer article by a one-shot process, based on the observation that the smallest diameter particles reach the walls of the mold fastest. By using the outer material of small particle size and an inner material of larger particles size, it could be possible to prepare a two-layer rotomolded article. The reference also describes using a mixture of an outer layer powder having a melting point of less than 145° C. and an inner layer powder having a melting point of greater than 145° C. The '849 reference also describes combining these methods by using a blend of a lower particle size, lower melting point inner powder with a higher particle size, higher melting point outer layer. Unfortunately, this method does not produce a clean layer separation, producing a fair amount of overlap and no well defined separation of the layers. If the second layer is formed by delaying the melting of the second layer powder, a rough inner surface is formed. JP 48-74741 describes the use of a low density polyethylene (LDPE) (M.P. 110° C.) to contain polyamide (PA) 6.6 powder (Tm=260 C) with a 103° C. HDPE outer layer. This leads to release of the PA powder before the PE layer is fully formed, resulting in poor layer separation, the PA layer being filled with PE particles resulting in poor barrier performance and poorer physical properties since these materials are not compatible. The adhesion between layers is purely mechanical and no chemical bonding between the layers is described.

There is a need for a single-step rotomolding process for producing a multi-layer molded article which provides for a strong chemical bond between layers without producing a rough inner surface.

Bag materials have been used to produce two layer tank using the same polymer, such as a tank using: (1) PE for both inside and outside layer with two different colors; or (2) a tank with a solid outer layer of PE and a foamed inside skin of PE. In both these cases a PE bag is used to contain the inside layer and there is no concern about mechanical integrity or barrier performance since both layers are formed with the same polymer.

Surprisingly it has been found that an article having two or more separate layers of different polymers having different melting points can be formed in a rotational molding process by a one step process, through the use of an outer layer polymer powder separated from an inner layer polymer powder by a release film. High quality moldings with both superior layer separation and strong adhesion between the two layers of different chemical composition are formed when the a release film having the proper composition and melting point is combined with the proper inner layer material and outer layer materials. The layer separation is needed for superior barrier performance or chemical resistance, while the adhesion between layers is needed to insure a high quality tank or container. The release film may form an enclosure or bag containing the inner layer polymer powder—or it may serve as a barrier between an insulated cavity in the mold or as a release mechanism for a drop-box. The article formed by the process of the invention has excellent layer separation, maximizing the mechanical and barrier properties of each layer while providing strong interlayer adhesion due to chemical compatibility or chemical reactivity between the layers.

SUMMARY OF THE INVENTION

The present invention relates to a molding process for preparing a multi-layer rotational molded article comprising the step of adding to a rotational molder:
  a) an outer layer polymer powder; and
  b) an inner layer polymer powder,
    wherein the inner layer polymer powder and the outer layer polymer powder are separated from each other by a release film,
    wherein said release film is from the same chemical family, or chemically compatible or reactive with the polymer powder having the higher melting point; and
    wherein said release film has a melting point at least 5° C. greater than that of the outer layer polymer powder.

One embodiment of the invention also allows for the higher melting resin to be contained within an insulated cavity separated from the mold by a film. The film is of the same chemical family or chemically compatible with or reactive with the polymer having the higher melting point. The release film of this embodiment has a melting point at least 5° C. higher than that of the higher melting point material.

The invention further relates to a multi-layer rotationally molded article, having excellent layer differentiation, good mechanical properties, effective barrier properties and smooth molded surfaces comprising an outer layer and an inner layer, wherein said outer layer and inner layers comprise polymers that are chemically different from each other and have melting points that differ by at least 10° C., and wherein said release film polymer is from the same chemical family or is chemically compatible with or chemically reactive with the polymer layer having the higher melting point, and wherein said release film had separated the outer layer polymer powder from the inner layer polymer powder at some point during the rotational molding process.

BRIEF DESCRIPTION OF THE DRAWINGS

In the Figures, the black layer is Polyamide 11, and the white layer is polyethylene. All the pictures are taken using a microtomed cross-section of a multi-layer tank at 50× on an optical microscope.

DETAILED DESCRIPTION OF THE INVENTION

Figure 1:
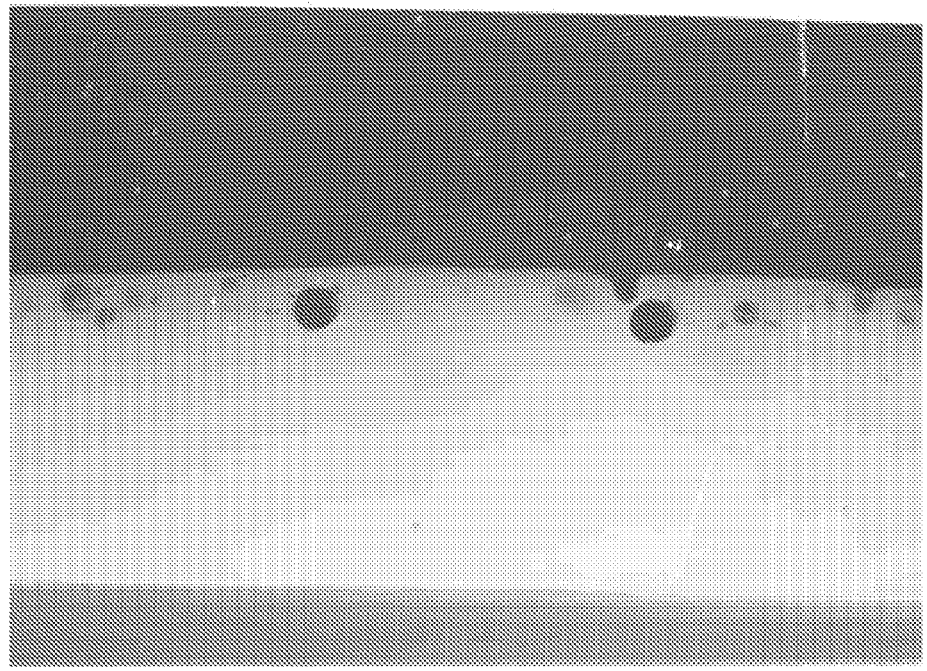
FIG. 1: is a cross-sectional photo of the article made in Example 2 of the invention, showing a good separation of the layers.

The invention relates to a rotomolding process for forming a multi-layer article of two different polymers with different melting points in which an outer layer polymer powder is added to a rotational molder along with an inner layer polymer powder that is separated from the outer layer powder by a release film.

As used herein, the term polymer "powder" refers to polymer powders, pellets, micropellets, and blends thereof, capable of being used in a rotational molding process. While powders are generally preferred, micropellets, pellets and other forms of the polymer may be used. The polymer powder, pellets or micropellets can be dry blended with up to 3 weight percent of additives.

The release film is used to separate the inner layer powder from the outer layer powder. The release film may be in the form of an enclosure or bag containing the inner layer material, or it may constitute a membrane or barrier between the mold and an insulated cavity that is permanently or temporarily mounted to the rotational mold. The relationship between the inner layer powder and release film is such that the melting point of the release film is 5° C. or more above the melting point of the outer layer powder, preferably 10° C. or more, and most preferably 20° C. or more. In the case where the inner layer polymer powder is enclosed in the release film, the release film has a melting point of 5° C. or more below the melting point of the inner layer, preferably 10° C. or more, and most preferably at least 20° C. or more below the melting point of the inner polymer powder.

In the case where the release film separates an insulated cavity containing the inner layer powder from the mold, the release film is such that the melting point of the release film is 5° C. or more above the melting point of the outer layer powder, preferably 10° C. or more, and most preferably 20° C. or more. The polymer powder in the insulated cavity, that will form the inner layer of the multi-layer article, may have a melting point below, equal to, or above the melting point of the outer layer polymer. This method provides a mechanism for placing the lower melting point polymer as the inner layer of the multi-layer article.

If the release film has a melting point too close to that of the lower melting point polymer layer, it will melt too soon and open early with the result that the outer layer will not be fully formed before the second layer is released. This leads to poor layer separation and mixing of the outer layer material into the inner layer material. If the release film material (bag) has a melting point too close to that of the higher melting point layer powder, lumps may form, since the film/bag melts at almost the same time the higher melting point powder begins to melt.

The release film is selected from a polymeric material that is compatible with, or from the same chemical family, as the inner layer polymer. The release film could be a block copolymer having blocks that are compatible with, or from the same chemical family, as the inner layer polymer. The higher melting point polymer must be capable of reacting with the lower melting point polymer to form a chemical bond or else must be chemically compatible with the lower melting point polymer.

While the release film can have various viscosities, it has been found that the melt viscosity of the release film material has an impact on the level of defects in the molded articles. When the melt viscosity is too high, defects are seen as lumps or bumps on the inside face of the molded article. When the viscosity of the release material is close to that of the inner resin powder, the best molded article quality is produced—having a smoother inner surface.

Additionally, a bag material with high toughness and tear resistance offers the best reliability when molding larger articles since it will withstand tumbling inside the mold without tearing of cracking—which can cause early release of the inside layer leading to less optimum layer separation.

The release film is typically between 1 to 8 mils thick, more preferably from 2 to 5 mils thick, and most preferably from 3 to 5 mils thick. The film should have a molecular weight as close as possible to that of the rotomolding powders being molded. A 50 micron thickness as found in the prior art is generally too low for practical molding processes due to poor bag toughness. Preferred is a bag with a minimum of 75 microns for the best molding process robustness.

The higher melting point polymer powder (typically forming the inner layer) can be any polymer, or mixture of polymers, having a melting point that is higher than that of the lower melting point polymer layer by at least 10° C., and most preferably by at least 20° C. In the case of a release film enclosure (bag) the higher melting point polymer will have a melting point that is at least 5° C. higher than that of the release film, preferably at least 10° C., and most preferably by at least 20° C. The polymer may be functionalized, partially functionalied or non-functionalized. Examples of useful higher melting point polymers include, but are not limited to, polyamides, co-polyamides, polyesters such as polybutylene terephalate, fluoropolymers such as polyvinylidene fluoride polymers, copolymers and terpolymers, ethylene-tetrafluoroethylene copolymers, acrylic and methacrylic polymers and copolymers, polyacetals, polyether block amides, liquid crystal polymer, polycarbonates, acrylics, aromatic or aliphatic polyketones, polyether ketones, polyethylene vinyl alcohol, polyphenylene sulfides, as well as blends or alloys of these materials. The inner layer polymer could also be a monomeric polymer that polymerizes above the release film melting point. The inner layer polymer could even be one that is polymerized in-situ in the rotomolder—such as PA6. Several preferred polyamides include PA 6, PA 11, PA 12, PA 6-6, polyamide diamine and copolyamides PA 6/12, 6.9, 6.10, PA6/11, PA 6.6/11, polyetherblock amides, PA 6/6.6, and mixtures thereof. The higher melting point polymer layer can also be a mixture of a polyamide and polyolefin, where the polyolefin can be functionalized or non-functionalized. The polymers may be impact-modified.

The lower melting point polymer powder (generally the outer layer) can be any polymer, or mixture of polymers, having a melting point that is lower than that of the release film by at least 5° C., preferably at least 10° C., and most preferably by at least 20° C. The outer layer polymer may be a thermoplastic or thermoset polymer—provided it is capable of being rotomolded. Thermoplastic polymers are preferred. The lower melting point polymer layer is generally composed of homopolymers or copolymers of ethylene, propylene, polyamide, functional fluoropolymers, functional polyolefins, polyesters, functionalized acrylics, polyethylene terephthalate or butylene terephthalate, liquid crystal polymer, polycarbonates, acrylics, polyamides, aromatic or aliphatic polyketones, polyether ketones, polyethylene vinyl alcohol, polyphenylene sulfides and alloys thereof with themselves or other polymers. Preferably, the outer layer contains at least some functionalized polymer having reactive species or endgroups that are able to create bonds with the inner layer polymer. This can be a mixture of one or more functionalized polymers and one or more non-functionalized polymers. Examples of useful functionalized polymers include functionalized polyolefin or amine terminated materials. A functionalised polyolefin is a polyolefin grafted or copolymerised with a material that provides polarity and/or reactivity and it therefore depends upon the nature of the adjacent layers. In one embodiment, the functionalized polyolefin is an α-olefin polymer containing reactive units (functionalities) such as acid, anhydride or epoxy functionalities. By way of example, mention may be made of polyolefins grafted or co- or terpolymerized with unsaturated epoxides such as glycidyl (meth) acrylate, or with carboxylic acids or the corresponding salts or esters such as (meth)acrylic acid, or alternatively with anhydrides of carboxylic acids such as maleic anhydride. An amine terminated material can also be used in outer layer and it is preferably selected from polyamide diamine (PAdiNH$_2$).

Preferably at least 2 percent by weight of the lower melting point polymer is a functionalized polymer. The polymer if forming the outer layer could even be one that is polymerized in-situ in the rotomolder—such as PA6. In one preferred embodiment, the lower melting point layer contains from 70 to 98 weight percent, and preferably from 80 to 95 weight percent of polyethylene or polypropylene (isotactic or syndiotactic) and 2 to 30 weight percent, and preferable 5 to 20 weight percent of a functionalized polyolefin.

The multi-layer composition is designed according to the properties required in the final article for the inner and outer layers. Examples of useful outer layer/release film/inner layer compositions of the invention include a polyamide 11 powder (inner), with a modified HDPE (outer), and a tough release film based upon PEBA (polyetherblock amide) thermoplastic elastomer. PEBA is a block copolymer having polyamide hard blocks and polyether soft blocks, thus it is from the same chemical family as the inner layer polymer. Another example of a release film material which works in a polyamide 11/HDPE system is a copolyamide which contains adipic acid-hexamethylene diamine, lactam 6 and lactam 12. This also is of the same chemical family as the outside layer. It has been found that PA12, PEBA with a hardness from 35D, 40D, 55D through to 72D work effectively as release film materials. These polymers have a hard block made or a polyamide such as lauryl lactam and a soft block made of a polyether such at polytetramethylene glycol. Further copolyamides can all be used as release film/bag materials effectively with PA 11 as the inner layer polymer. Finally a functionalize polypropylene copolymer could be used as a bag material if the melting point were correctly positioned and the polypropylene contained reactive groups capable of reacting with the PA11, while containing the proper composition to be compatible with the polyolefin outer layer.

Other examples of multi-layer designs include, but are not limited to:
  outer layer of modified HDPE with anhydride functionality, release layer of Copolyamide with Tm=150° C. or PEBA with Tm=145° C., and an inner layer of PA12, PA6, PA11/6.6 copolyamide, or PA11/PA12 copolyamide.
  outerlayer of modified HDPE with epoxide functionality, release layer of PVDF copolymer with Tm=145° C., and inner layer of modified PVDF with anhydride functionality.
  Outer layer of modified HDPE with epoxide functionality, release layer of block copolyester elastomer, and inner layer of polybutylene or polybutylene terephthalate polyester.
  Outer layer of a blend of polyolefin and functional polyolefin, and an inner layer of a polyvinylidene fluoride grafted with maleic anhydride or a blend of a polyvinylidene fluoride grafted with maleic anhydride and an unfunctionalized polyvinylidene fluoride.

A one-shot rotomolding process provides a very efficient molding process since it does not typically extend molding cycles and no large drop boxes are required. The molding process involves adding a release film bag containing the inside layer and the powder for the outside layer into the mold at the same time. The molding cycle is then completed to a peak internal air temperature appropriate (PIAT) for the inside layer, and then the sample is cooled—preferably with some water cooling to reduce the potential for shrinkage voids.

In an alternative method, the release film material could be used to cover an opening to an insulated cavity that is permanently or temporarily mounted to the mold. The film forms a temperature release mechanism that allows release of the inside layer powder at a point where the outside layer is already formed; therefore acting as a gate for the introduction of the inner layer from the insulated cavity. The release film is useful as a gate material have the same properties described above for a bag.

The invention employs a chemical bonding between layers to achieve good interlayer bonding, rather than a mechanical inter-locking which leads to poor layer differentiation. The layers must be compatible or preferably form bonds in order to provide the mechanical performance and barrier properties due to the excellent layer differentiation with little mixing of the materials at the interface. The walls of the tank are not prone to delamination due to the chemical bonding between layers. The good layer separation also enhances chemical resistance when the inside layer is the "barrier" material, since there is no mixing with the outer layer which has lower chemical resistance.

An additional advantage of using a release film bag containing the inner layer is found in materials handling. Since the powder is enclosed in a bag, dusting and other handling hazards are avoided.

Molded articles formed by the process of the invention are characterized by excellent layer differentiation, good mechanical properties, effective barrier properties and smooth molded surfaces. The multi-layer article formed in the process of the invention typically has a inner layer thickness of 0.5 to 10 mm, preferably 1 to 3 mm, and an outer layer thickness of 1 to 10 mm, preferably 2 to 6 mm. Multi-layer articles that can be formed by the process include, but are not limited to, fuel tanks, hydraulic tanks, chemical tanks, oil tanks and bottles.

In one embodiment, an article having three or more layer can be formed by using two bags with two different melting points. Two release films with two different melting points could be used to release two different layers resulting in a three-layer construction. Also, two or more release film bags containing the same or different materials could be used to improve molding consistency or to result in a layer made from a mixture of two or more materials.

EXAMPLES

One-shot molding trials were conducted using a STP Lab 40 rotomolder, PA6 or PA11 polyamide rotomolding powder that is about 35 to 40 mesh, a series of different grades of polyethylene, and different bag materials. The results are shown in Table 1.

The oven temperature for all trials was 575° F. (300° C.) and with a cycle time set such that the peak internal air temperature reached 480° F. (250° C.) when PA6 was used and 420° F. (215° C.) when PA11 was used. A trial using a 2.5 mil PE bag with PA11 and medium density polyethylene (MDPE) resulted in a tank wall in which the polyamide layer contained multiple holes, no coherent layer was present, most of the wall being a mixture of PA and PE, and the benefit of having the two separate layers was mostly lost. By comparison, Example 2 had excellent layer separation in which the chemical resistance, and barrier performance of the PA11 layer is maintained. In addition, because a polyolefin containing a functional polyolefin is used, good adhesion is achieved due to chemical bonding at the interface.

Example 1 vs. Comparative Examples 2 and 3

In these trials PA6 powder was chosen as the inside layer powder and different MDPE's were molded. Example 1 uses a Copolyamide A release film from the same chemical family as the inside layer. In Example 1 there is very good layer separation and very good adhesion as DPO25 (containing functional polyolefin) is used. In Comparative 2 normal PE (containing no functionalization) is used while using the same release film material. The layer separation is still quite good, but there is no adhesion between the layers. In Comparative 3 a PE film is used as disclosed in JP No 48-74741. Its melting point is close to that of the outside layer. In this case the layer separation is very poor and there are large holes in the PA layer where PE has mixed in. There is adhesion between the two layers due to a large amount of mechanical intermixing, rather then by chemical reaction or chemical compatibility. There is no integrity of the PA6 layer.

Examples 2 and 3 vs. Comparative Examples 4, 5, and 6

Figure 2:
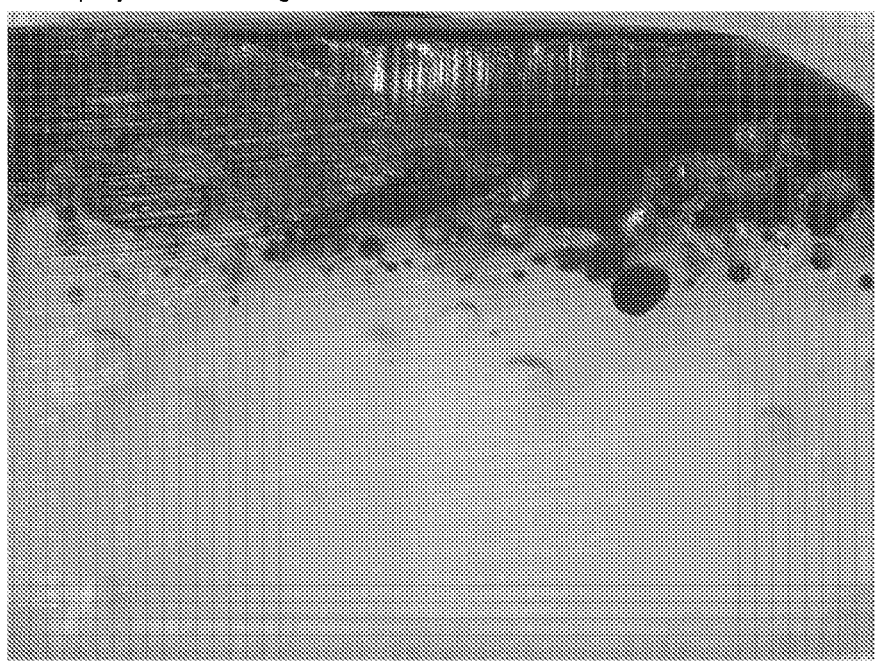
FIG. 2: is a cross-sectional photo of the article made in Example 3 of the invention. It shows Clear separation of PA11 layer from the PE layer. No apparent PE is in the PA layer.
Figure 3:
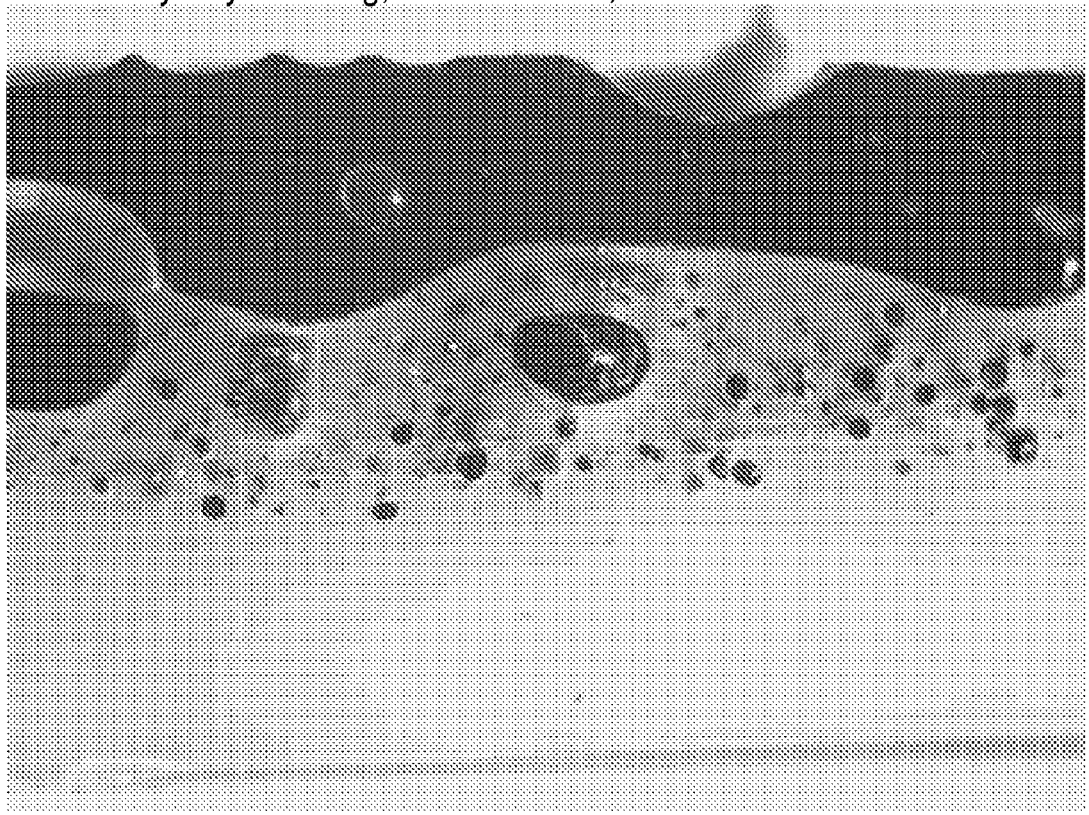
FIG. 3: is a cross-sectional photo of the article made in Comparative 4 showing mixing between the polyamide and polyethylene layers.
Figure 4:
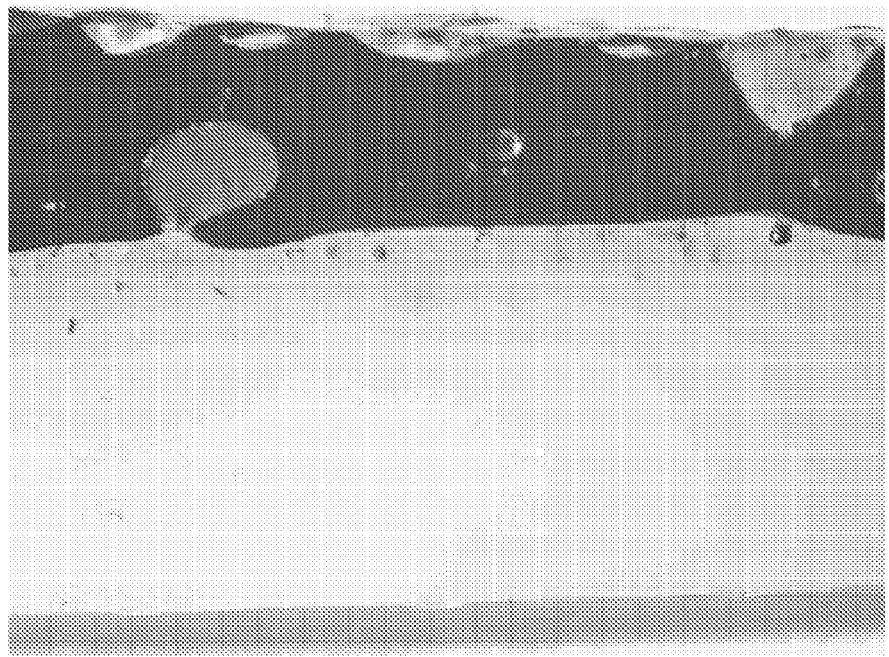
FIGS. 4 and 5: are cross-sectional photos of the article made in Comparative 5 showing large pores in the PA-11 layer.
Figure 5:
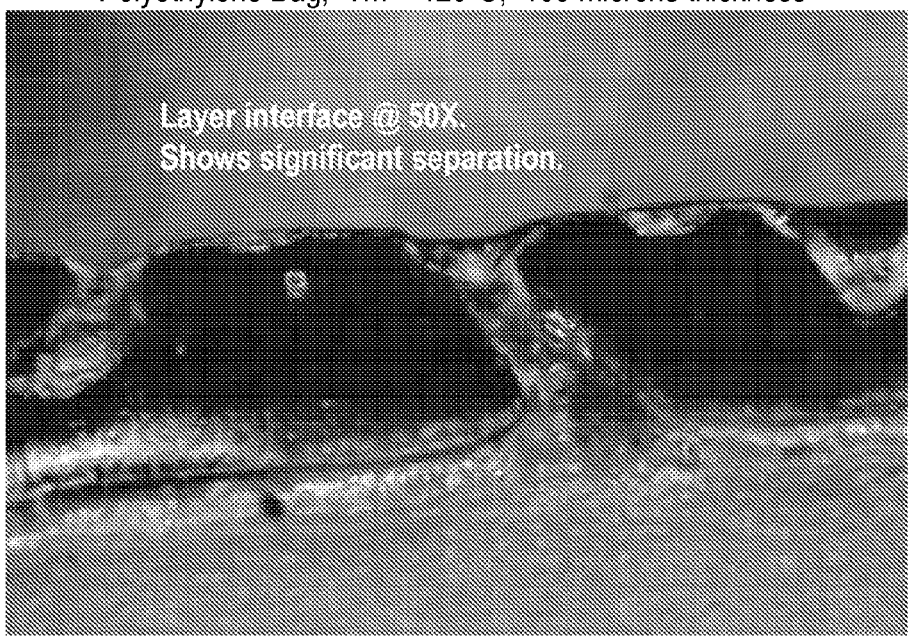
Figure 6:
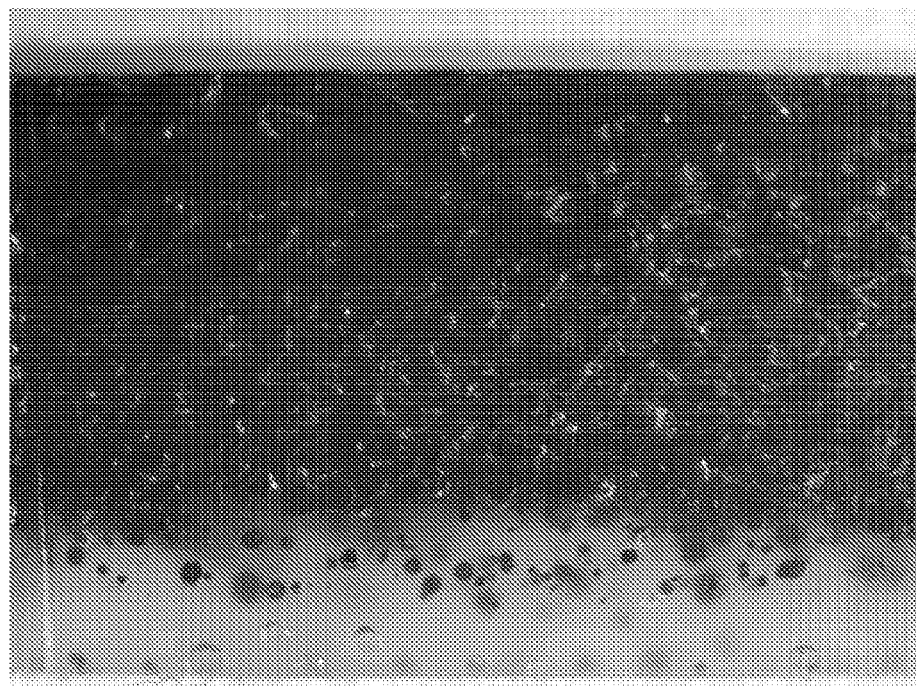
FIGS. 6 and 7: are cross-sectional photos of the article made in Comparative 6 showing a large amount of mixing between the PA11 and PE layers.
Figure 7:
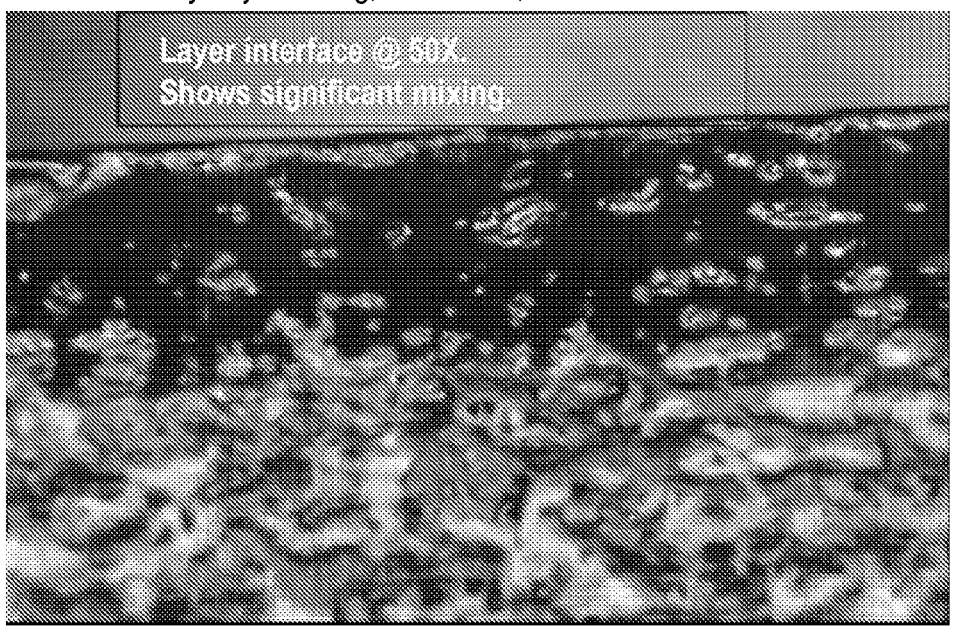

The experiments numbered Comparative 4, 5 and 6 compare the results using a PE release film and PA11 to Example 2 of the invention using bags that are chemically compatible with the inner layer polymer. Comparative 6 uses a PE release film and a polyolefin containing a functional polyolefin. None of the Comparative experiments result in good layer separation, and the integrity of the PA11 layer is lost. Examples 2 and 3 show the excellent layer differentiation that can be achieved with this invention. Both also show excellent interlayer adhesion. The results for both the example of the invention and comparative examples can be seen in the micrographs of FIGS. 1-7. The black layer is PA11 while the light layer is the MDPE or modified MDPE.

It was also found that even when the melting point of the release film (bag) is same as that of the inside layer, good layer separation can be achieved. However larger defects are seen on the inside layer of the tanks.

In Table 1 below:
Copolyamide A (COPA) is a release film that is a copolymer of adipic acid/hexamethylene diamine, lactam 6 and lactam 12 with an optical melting point of 150 to 155° C.
DP025 is a metallocene MDPE that has been modified to contain 15% of a functional polyolefin containing grafted maleic anhydride functionality.
DP043 is a metallocene HDPE with a density of 0.94 g/cc unfunctionalized.
MDPE is a MDPE (Eq 635-662)
PEBA B is a release film that is a 40 shore D block copolyamide-polyether containing a lauryl lactam hard block and a polytetramethylene glycol soft block with a melting point of 145° C.

TABLE 1

| | Polyethylene Type | Polyamide Type | Bag Type | PA Tm °C. | PE Tm °C. | Bag Tm °C. | Layer Separation | |
|---|---|---|---|---|---|---|---|---|
| Ex. 1 | DP025 | PA 6 | 5 mil CoPA | 215 | 121 | 150 | Very Good | Minor surface roughness noted in the PA6. PA layer is continuous as is PE layer. Adhesion is excellent but cannot be measured due to the low elongation of the PA6 |
| Comp. 2 | MDPE | PA 6 | 5 mil CoPA | 215 | 125 | 150 | Very Good | Good but uneven separation - No adhesion as layers separated easily. Interior smooth but with some bumps. |

TABLE 1-continued

| | Poly-ethylene Type | Poly-Amide Type | Bag Type | PA Tm °C. | PE Tm °C. | Bag Tm °C. | Layer Separation | |
|---|---|---|---|---|---|---|---|---|
| Comp. 3 | DP043 | PA 6 | 4 mil PE | 215 | 125 | 120 | Very Poor | Large pores of PE in PA6 layer making layer look porous. PA layer not continuous. Adhesion per JP patent is due to mechanical interlocking. |
| Comp. 4 | DP043 | PA 11 | 4 mil PE | 190 | 125 | 120 | Very Poor | PA11 layers has large hole in it due to mixing with PE. PA layer looks to have no integrity, but PE layer is continuous. |
| Comp. 5 | MDPE | PA 11 | 4 mil PE | 190 | 125 | 120 | Very Poor | Large pores in PA11 layer - layer has holes in it. PE layer is continuous. Adhesion at 27 N/cm due to interlocking of layers |
| Comp. 6 | DP025 | PA 11 | 2.5 mil PE | 190 | 120 | 120 | Very Poor | Large mixing of PE and PA. Holes in PE layer noticed. PE only has a skin against outside wall. The PA barrier is lost due to extreme mixing of materials |
| Ex. 2 | DP025 | PA 11 | 3.5 mil PEBA B | 190 | 120 | 145 | Excellent | PA11 layer is smooth, shiny without any pores or holes. The layer differentiation is almost perfect. Adhesion is excellent. Looks like the same tank as would be produced by two shot process |
| Ex. 3 | DP025 | PA 11 | 5 mil CoPA | 190 | 121 | 150 | Excellent | Clear separation of PA11 layer from PE layer. No apparent PE in the PA layer |

What is claimed is:

1. A molding process for preparing a multi-layer rotational molded article comprising the step of adding to a rotational molder:
   a) an outer layer polymer powder, wherein said outer layer polymer powder comprises a blend of a polyolefin and a functional polyolefin; and
   b) an inner layer polymer powder selected from the group consisting of polyamide and polyvinylidene fluoride,
   wherein the inner layer polymer powder and the outer layer polymer powder are separated from each other by a release film having a thickness of from 1 to 8 mils, wherein said release film is a polyamide different from the inner layer polyamide when the inner layer is a polyamide, and said release film is a polyvinylidene fluoride different from the inner layer polyvinylidene fluoride when the inner layer is a polyvinylidene fluoride, and
   wherein said release film has a melting point at least 10° C. greater than that of the outer layer polymer powder, and at least 10° C. less than that of the inner layer.

2. The molding process of claim 1, wherein said release film has a melting point at least 5° C. less than that of the inner layer polymer powder.

3. The process of claim 1, wherein the release film has a melting point at least 20° C. greater than that of the outer layer polymer powder, and a melting point at least 20° C. less than that of the inner layer polymer powder.

4. The process of claim 1 wherein said release film has a thickness of from 3 to 5 mils thick.

5. The process of claim 1, wherein said release film is in the form of a bag or other enclosure, in which the inner layer polymer powder is completely enclosed.

6. The process of claim 1, wherein the release film forms a barrier between an opening to an insulated cavity that is permanently or temporarily mounted to a mold.

7. The process in claim 6, wherein the release film has a inciting point at least 5° C. greater than the outside layer and 5° C. lower than the inner layer.

8. The process of claim 1, wherein said inner layer comprises PA 11 and said release film comprises a polymer selected from the group consisting of PA12, PEBA block ether block amide polymers with hardness from 35D to 72 D, copolyamides of PA11 with lactam 6, lactam 12, and adipic acid-hexamethylene diamine, and copolyamides of PA12 with lactam 6, lactam 12, and adipic acid-hexamethylene diamine.

9. The process of claim 1, wherein said outer layer polymer powder comprises a blend of a polyolefin and a functional polyolefin, and said inner layer polymer powder comprises a polyvinylidene fluoride grafted with maleic anhydride, a blend of a polyvinylidene fluoride grafted with maleic anhydride and an unfunctionalized polyvinylidene fluoride, or other functionalized fluoropolymer.

10. The process of claim 1, wherein the polymer powder having the lower melting point comprises at least 2 weight percent of a functionalized polymer.

11. The process of claim 1, wherein said outer layer polymer comprises from 70 to 98 weight percent of polyethylene or polypropylene, and from 2 to 30 weight percent of functionalized polyolefin.

12. The process of claim 11, wherein said outer layer polymer comprises from 80 to 95 weight percent of polyethylene or polypropylene, and from 5 to 20 weight percent of functionalized polyolefin.

13. The process of claim 1, wherein said inner layer polymer and outer layer polymer are compatible or capable of forming chemical bonds.

14. The process of claim 1, wherein said inner layer polyamide is selected from the group consisting of PA 6, PA 11, PA 12, PA 6-6, polyamide diamine; copolyamides PA 6/12, 6.9, 6.10, PA6/11, PA 6.6/11, polyetherblock amides, PA 6/6.6, and mixtures thereof.

* * * * *